United States Patent
Macik et al.

(10) Patent No.: US 9,152,528 B2
(45) Date of Patent: Oct. 6, 2015

(54) LONG TERM LOAD GENERATOR

(75) Inventors: Pavel Macik, Brno (CZ); Lukas Petrovicky, Most (CZ)

(73) Assignee: Red Hat, Inc., Raleigh, NC (US)

( * ) Notice: Subject to any disclaimer, the term of this patent is extended or adjusted under 35 U.S.C. 154(b) by 1304 days.

(21) Appl. No.: 12/870,660

(22) Filed: Aug. 27, 2010

(65) Prior Publication Data

US 2012/0053894 A1 Mar. 1, 2012

(51) Int. Cl.
*G06F 11/34* (2006.01)
*G06F 9/38* (2006.01)
*H04L 12/26* (2006.01)

(52) U.S. Cl.
CPC .......... *G06F 11/3414* (2013.01); *G06F 9/3851* (2013.01); *G06F 11/3419* (2013.01); *G06F 11/3423* (2013.01); *G06F 2201/875* (2013.01); *H04L 43/50* (2013.01)

(58) Field of Classification Search
CPC .......... G06F 11/3414; G06F 2201/875; G06F 11/3419; G06F 11/3423; G06F 9/3851; H04L 43/50
USPC .......... 702/119, 176, 182; 717/127, 131, 38.1
See application file for complete search history.

(56) References Cited

U.S. PATENT DOCUMENTS

| | | | |
|---|---|---|---|
| 6,601,020 B1 * | 7/2003 | Myers .......................... | 702/186 |
| 7,711,822 B1 * | 5/2010 | Duvur et al. .................. | 709/226 |
| 2002/0032558 A1 * | 3/2002 | Strong et al. .................... | 703/22 |
| 2006/0129992 A1 * | 6/2006 | Oberholtzer et al. ......... | 717/124 |
| 2007/0043531 A1 * | 2/2007 | Kosche et al. ................ | 702/182 |
| 2009/0006520 A1 * | 1/2009 | Abib et al. .................... | 709/201 |

OTHER PUBLICATIONS

Kurniawan, Budi , "Using JMeter", http:/onjava.com/lpt/a/3066, (Jan. 15, 2003), pp. 1-9.

* cited by examiner

*Primary Examiner* — Alexander Satanovsky
(74) *Attorney, Agent, or Firm* — Lowenstein Sandler LLP (57) ABSTRACT

A method and system for long-term load generation is described.

23 Claims, 6 Drawing Sheets

LONG TERM LOAD GENERATOR

TECHNICAL FIELD

Embodiments of the present invention relate to performance testing systems, and more specifically, to automated multi-threaded load generators.

BACKGROUND

In performance testing, there is a common practice of examining the speed, durability, and/or reliability of a tested software feature, component, or system. A performance iteration is a single operation or set of multiple operations that is defined to determine performance of the software feature, component, or system. A performance test executes this iteration one or more times to determine the speed, durability, and/or reliability of the software feature, component, or system. The process of executing the iterations is called load generating and the software tool that executes the performance iterations is called a load generator.

Load generators can be used to generate a load to test the functional behavior and measure performance of the tested software feature, component, or system. Load generators can be used to simulate a heavy load on a server, network, or object to test its strength, or to analyze overall performance under different load types. Conventional load generators can test the performance of various types of software features, components, or systems, such as web servers (e.g., Hypertext Transfer Protocol (HTTP), HTTP Secure (HTTPS), Simple Object Access Protocol (SOAP) servers, database servers, Lightweight Directory Access Protocol (LDAP) servers, Java Message Service (JMS) servers, mail servers (e.g., Post Office Protocol 3 (POP3), POP secure (P0P3S) and Internet Message Access Protocol (IMAP), IMAP Secure (IMAPS) servers).

Some conventional load generators can provide a multi-threading framework that allows concurrent sampling by many threads and simultaneous sampling of different functions by separate thread groups. The typical load generating case in a multi-threaded environment performs the following: 1) receives user input that specifies test attributes as a number of concurrent threads that execute iterations, and the number of iterations per thread; 2) runs the load generator; and 3) quantifies the performance of the tested software feature, component, or system. These conventional load generators can be configured with pluggable timers for various load statistics, but do not receive an input to indicate an overall time duration for the performance test. These conventional load generators cannot reliably generate load using multiple concurrent threads during performance testing for long periods of time, such as days, weeks, months, etc. with limited available resources, such as memory.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

A method and system for long-term load generation is described. In one embodiment, a long-term load generator receives input that identifies a test subject to be tested, as well as a number of concurrently processing threads, a size of a thread pool, and a time duration that specifies how long the test subject is to be tested. The thread pool has multiple processing threads that execute performance iterations. The long-term load generator generates a multi-threaded load to test performance of the test subject, where the multi-threaded load executes the specified number of concurrent processing threads from the thread pool for the specified time duration. Each of the performance iterations may be a set of defined operations that use the test subject. For example, the performance iterations may include computing, message processing, image processing, software component initialization, login processing (e.g., user logging into a system executing on a separate computing device), or the like. The performance iteration, which is executed by a client thread on a client machine, may communicate over a network with the tested subject, which is executed on a server machine. In another embodiment, the performance iteration is a single operation that uses the test subject. In yet another embodiment, the performance iteration is a structured pipeline of operations that uses the test subject.

The long-term load generator can be part of a performance testing system in a client-server environment with the load generator being located on the client side and the test subject being on the server side. The test subject may be a software feature, a software component, or a software system that executes on a computing device that is accessed over a network, such as the Internet, for example, the test subject may be various types of servers (e.g., web servers, databases, SOAP servers, JMS, mail servers, or the like), various types of networks or network devices, scripts, objects, or the like. In another embodiment, the long-term load generator quantifies the performance and reports the quantified performance of the test subject.

Embodiments of the present invention provide an improved load generator that reliably and automatically generates a multi-threaded load for a long period of time, such as a matter of days, weeks, months, etc.), with only limited available resources (e.g., memory). Unlike the conventional load generators, embodiments of the long-term load generator use a thread pool of a fixed size to execute a specified number of concurrent processing threads for a specified time duration. The size of the thread pool can be used to maintain the amount of available resources for testing, and the thread count can be used to maintain the specified number of concurrent processing threads for the specified time duration. The long-term load generator can operate in cycles of a specified time period in which it can execute threads from the thread pool to perform the iterations. After each cycle, the long-term load generator knows how many iterations it has executed. The long-term load generator continues generating the multi-threaded load in each cycle until the specified time duration lapses.

In the following description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the embodiments of the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "generating," "quantifying," "reporting," "executing," "defining," "specifying," "initializing," "processing," "providing," "computing," "calculating," "determining," "displaying," or the like, refer to the actions and processes of a computing system, or similar electronic computing systems, that manipulates and transforms data represented as physical (e.g., electronic) quantities within the computing system's registers and memories into other data similarly represented as physical quantities within the computing system memories or registers or other such information storage, transmission or display devices.

Embodiments of the present invention also relate to an apparatus for performing the operations herein. This apparatus may be specially constructed for the required purposes, or it may comprise a general-purpose computing system specifically programmed by a computer program stored in the computing system. Such a computer program may be stored in a computer-readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

Figure 1:
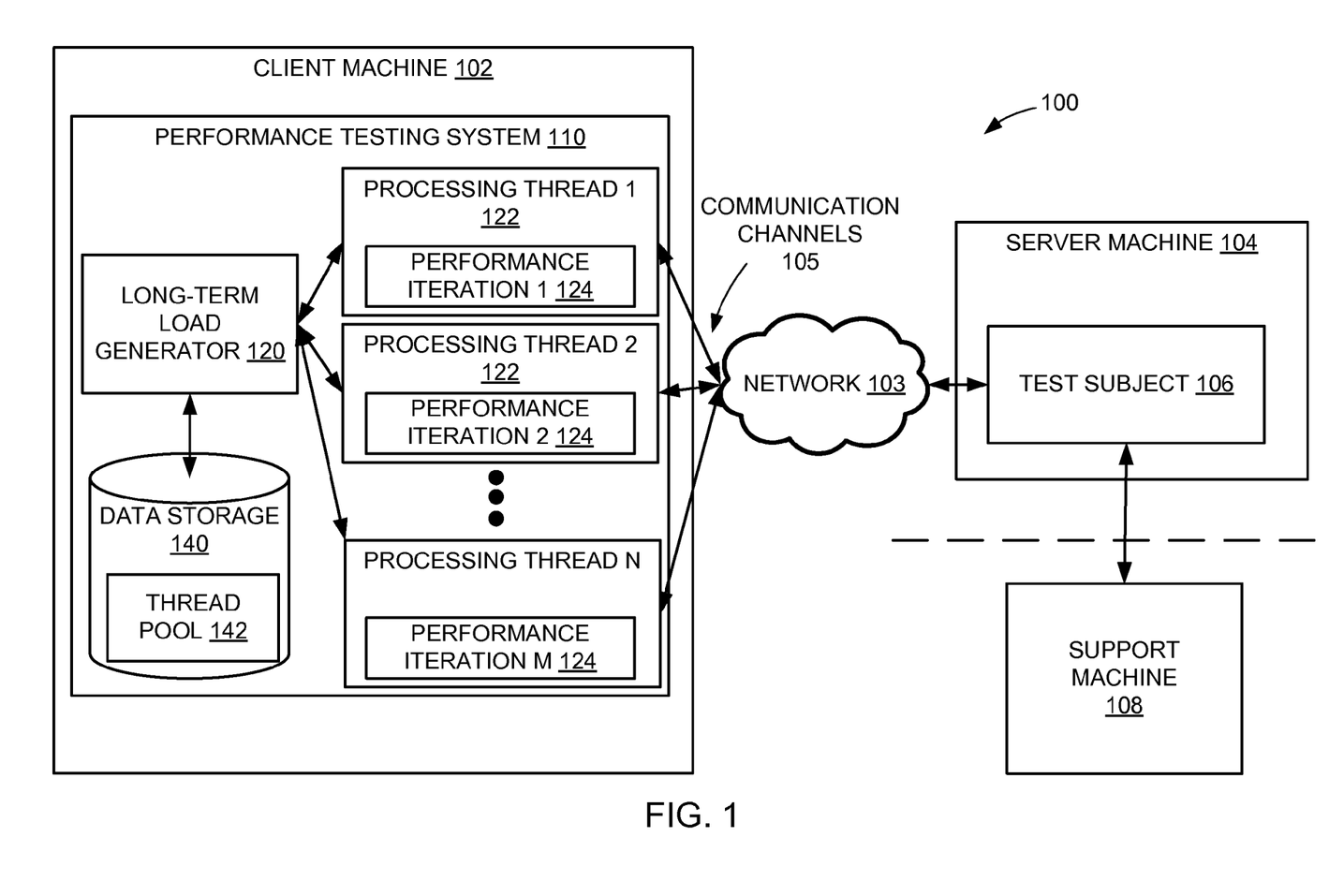
FIG. 1 is a block diagram of an exemplary network architecture in which embodiments of a performance testing system, having a long-term load generator, may operate.

FIG. 1 is a block diagram of exemplary network architecture 100 in which embodiments of a performance testing system 110, having a long-term load generator 120, may operate. The network architecture 100 may include a server machine 104 that executes a test subject 106 and a client machine 102 connected via a network 103, which may be a private network (e.g., a local area network (LAN), wide area network (WAN), intranet, etc.) or a public network (e.g., the Internet). The server machine 104 may be one or more machines including one or more server computers, gateways, or other computing systems. The test subject 106 may be a software feature, a software component, or a software system that executes on the server machine 104 that is accessed by the client machine 102 over the network 103, such as the Internet. For example, the test subject may be various types of software, such as scripts, objects, servers, or the like.

The client machine 102 may be a computing device such as, for example, a desktop computer, laptop computer, server, cellular phone, personal digital assistant (PDA), etc. In one embodiment, the client machine 102 is a server of an enterprise, but is a "client" with respect to the server machine 104. The client machine 102 interacts with the server machine 104 by exchanging messages via standard protocols, e.g., FTP and HTTP. The client machine 102 executes a performance testing system 110, which includes the long-term load generator 120. The long-term load generation operations of the long-term load generator 120 are described in more detail below with respect to FIGS. 3-4B. The long-term load generator 120 may be a stand-alone application that executes on the client machine 102 or may be part of the performance testing system 100 that may include other performance-related processes. The client machine 102 may also include a graphical user interface (GUI) for allowing a user to specify the testing parameters of the testing performance system 110, including mechanisms to allow the user of the performance testing system 110 to specify a number of concurrent threads (thread count), the size of the thread pool, and the time duration that specifies how long the long-term load generator should generate load, as well as to view the quantified performance of the test subject 106.

In the depicted embodiment, the long-term load generator 120 executes, from a thread pool 142, multiple client processing threads 122, each for a single performance test iteration 124. The client processing threads 1-M 122, represent concurrent processing threads of the multi-threaded load that are currently being executed by the performance testing system 110. In the depicted embodiment, the long-term load generator 120 is coupled to data storage 140, which stores the thread pool 142 of the multiple processing threads 122. The data storage 140 may include one or more storage devices (e.g., the computer-readable medium described above) that are local to the client machine 102 and/or remote from the client machine 102.

During iteration execution, the client processing thread 122 communicates through one or more communication channels 105 (e.g., bi-directional arrays between clients and test subject 106). In one embodiment, the communication channels 105 are network connections (e.g., TCP/IP network connections) using network protocols, such as HTTP, JMS, FTP, or the like, depending on the type of test subject 106 and/or the type of performance iteration scenario. In some embodiments, there can be other support machines, like the depicted support machine 108, that are needed to test the test subject 106. For example, the support machine 108 may be a database machine, FTP machine, web-services machine, network file system (NFS) machine, HTTP server machine, email server machine, or the like, depending on the type of test subject 106 and/or the type of performance iteration scenario. The support machine 108 may reside in the same network (e.g., LAN) as the server machine 104, or alternatively, may reside in another network. In another embodiment, the server machine 104 communicates with the support machine 108 over the network 103.

Figure 2:
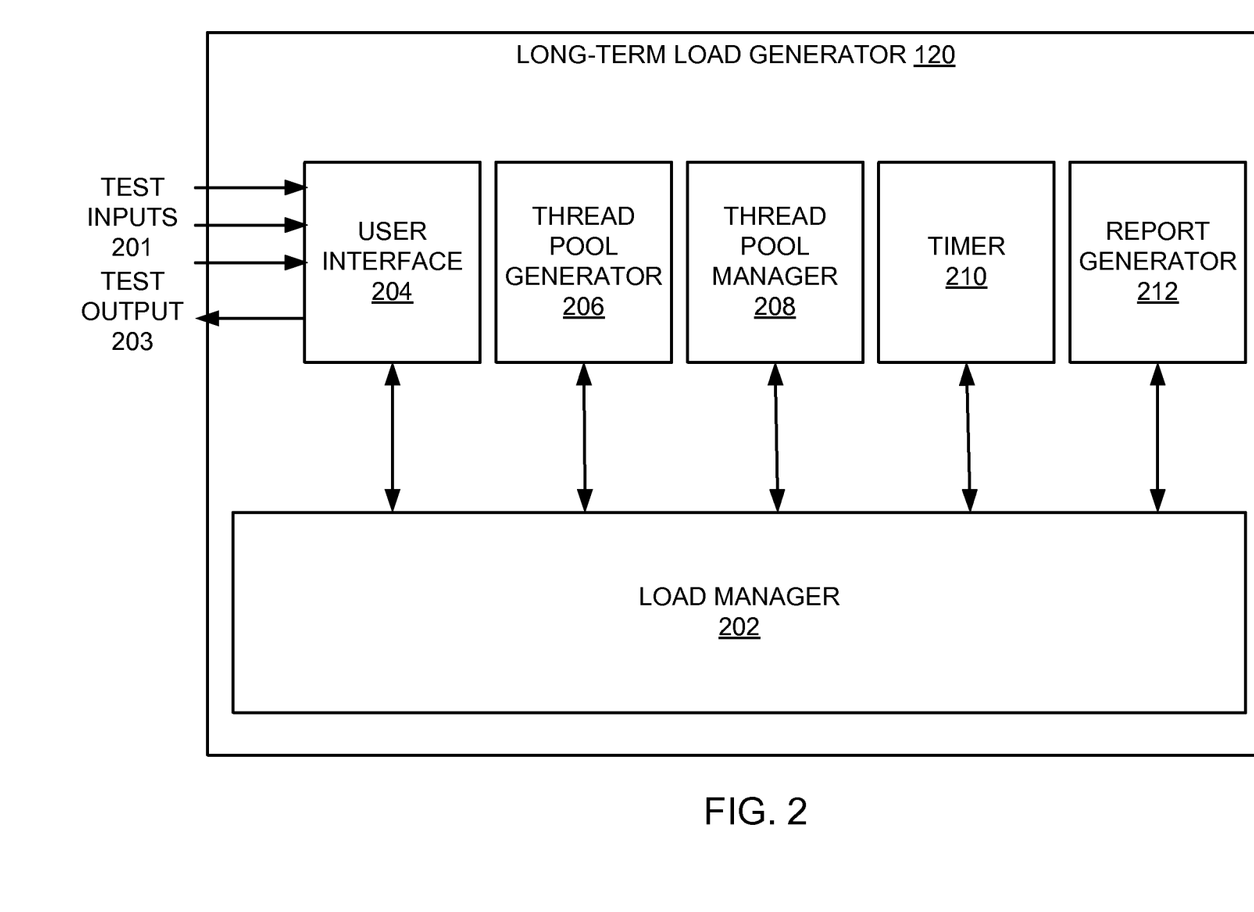
FIG. 2 is a block diagram of the long-term load generator according to one embodiment.

FIG. 2 is a block diagram of the long-term load generator 120 according to one embodiment. The long-term load generator 120 includes a load manager 202, a user interface 204, a thread pool generator 206, a thread pool manager 208, a timer 210, and a report generator 212. The load manager 202 receives user input 201 through the user interface 204. The user input 201 may be input that identifies the test subject 106 to be tested (e.g., the software feature, component, or system). The user input 201 may also be input that specifies a number of concurrent processing threads (maximum thread count C), a size of a thread pool (e.g., fixed thread pool (TP), and a time duration ($t_D$) that specifies for how long (e.g., days, weeks, months, years, etc.) the test subject 106 is to be tested. The user input 201 may also be other input that specifies other testing parameters of the performance testing system 110, such as what performance results to include in intermittent or final reports of the quantized performance of the test subject 106, the frequency of the reports, the location and/or manner for publishing the results, or the like. The load manager 202 can also provide test output 203 through the user interface 204.

The user interface 204 may be GUI, a command line interface (CLI), or other types of interfaces known by those of ordinary skill in the art. For example, a user of the performance testing system 110 can access the long-term load generator 120 via a browser, in which case the user interface 204 is a web-based browser. When using a web-based browser for the user interface 204, the user interface 204 may generate one or more web pages that include input fields, or other input mechanisms that allow the user to specify the testing parameters, including the number of concurrent processing threads (C), the thread pool size (TP), and the time duration ($t_D$).

Based on the user input 201, the load manager 202 uses the thread pool generator 206 to create the thread pool 142 according to the specified size of the thread pool (TP) received from the user interface 204. The thread pool 142 can have multiple processing threads that can each be executed to perform a single performance iteration. The thread pool 142 can be stored in the data storage 140. In one embodiment, the thread pool generator 206 creates one or more processing threads based on the input that specifies the fixed size of the thread pool (TP), and then inserts the created processing threads into the thread pool (P). In one embodiment, the load manager 202 instructs the thread pool generator 206 to initialize the thread pool (P) to be empty, and then subsequently creates and inserts the specified number of processing threads into the empty thread pool (P) so that the thread pool (P) is the fixed size (TP). It should be noted that the fixed size defines the maximum number of processing threads and number of threads specifies how many of these threads should run concurrently.

The load manager 202 uses the thread pool manager 208 to execute the specified number of concurrent processing threads from the thread pool (P) concurrently in parallel. It should be noted that executing a specified number of processing threads in parallel, as described herein, means that at least some of the execution of the processing threads is performed concurrently, regardless of when the respective processing threads begin and complete execution. For example, two processing threads may start at the same time, but one of the processing threads may complete execution before the other. Another example is two processing threads may be started at different times, but at least some of the execution of the two threads is performed concurrently to create a multi-threaded load to test the test subject 106. The thread pool manager 208 may track the current thread count (TC). For example, upon initialization, the thread pool manager 208 initializes the current thread count to be zero, and increments and decrements the current thread count when a processing thread is executed and when the processing thread is completed, respectively. The load manager 202 may also use the thread pool manager 208 to remove the threads from the thread pool (P) after execution.

The load manager 202 uses the timer 210 to keep track of the amount of time the test subject 106 is being tested. The timer 210 allows the load manager 202 to generate the multi-threaded load to test the test subject 106 for the entire time duration ($t_D$) as specified in the user input 201. In one embodiment, the load manager 202 initializes a current time (t) of the test to zero when initializing the thread pool (P) to be empty. Periodically, such as after each cycle, as described herein, the load manager 202 determines if the current time (t) is less than the specified time duration ($t_D$). If the current time (t) is less than the specified time duration ($t_D$), the load manager 202 continues the process, generating the multi-threaded load. However, if the current time is not less than the specified time duration ($t_D$), the load manager 202 quantifies the performance of the test subject, for example, using the number of iterations (S) executed during the specified time duration ($t_D$), and possibly reports the quantified performance as described herein. Using the timer 210, the load manager 202 can reliably and automatically generate the multi-threaded load for the specified time duration ($t_D$) (e.g., a long period of time, such as a matter of days, weeks, months, etc.), with only limited available resources (e.g., memory). The amount of available resources can be maintained using the specified size of the thread pool.

The load manager 202 uses the report generator 212 to report the quantified performance of the test subject 106. The load manager 202 can quantify the performance of the test subject 106 and send the quantified performance to the report generator 212, which generates a report of the test results. Based on testing parameters specified in the user input 201, the report generator 212 may generate one or more intermittent or final reports of the quantified performance. The reports may be generated as specified intermittent time intervals during the specified time duration ($t_D$) and/or at the end of the specified time duration ($t_D$). The report generator 212 may be configured to publish the reports. In one embodiment, the report generator 212 publishes the report(s) as the test output 203 via the user interface 204. In another embodiment, the report generator 212 writes it to a log file stored at a specified location. In another embodiment, the report generator 212 sends an email with the results in the body of the email, or as an attachment to the email, to one or more specified email addresses. Alternatively, the report generator 212 may publish the reports using other mechanisms as would be appreciated by one of ordinary skill in the art having the benefit of this disclosure.

Figure 3:
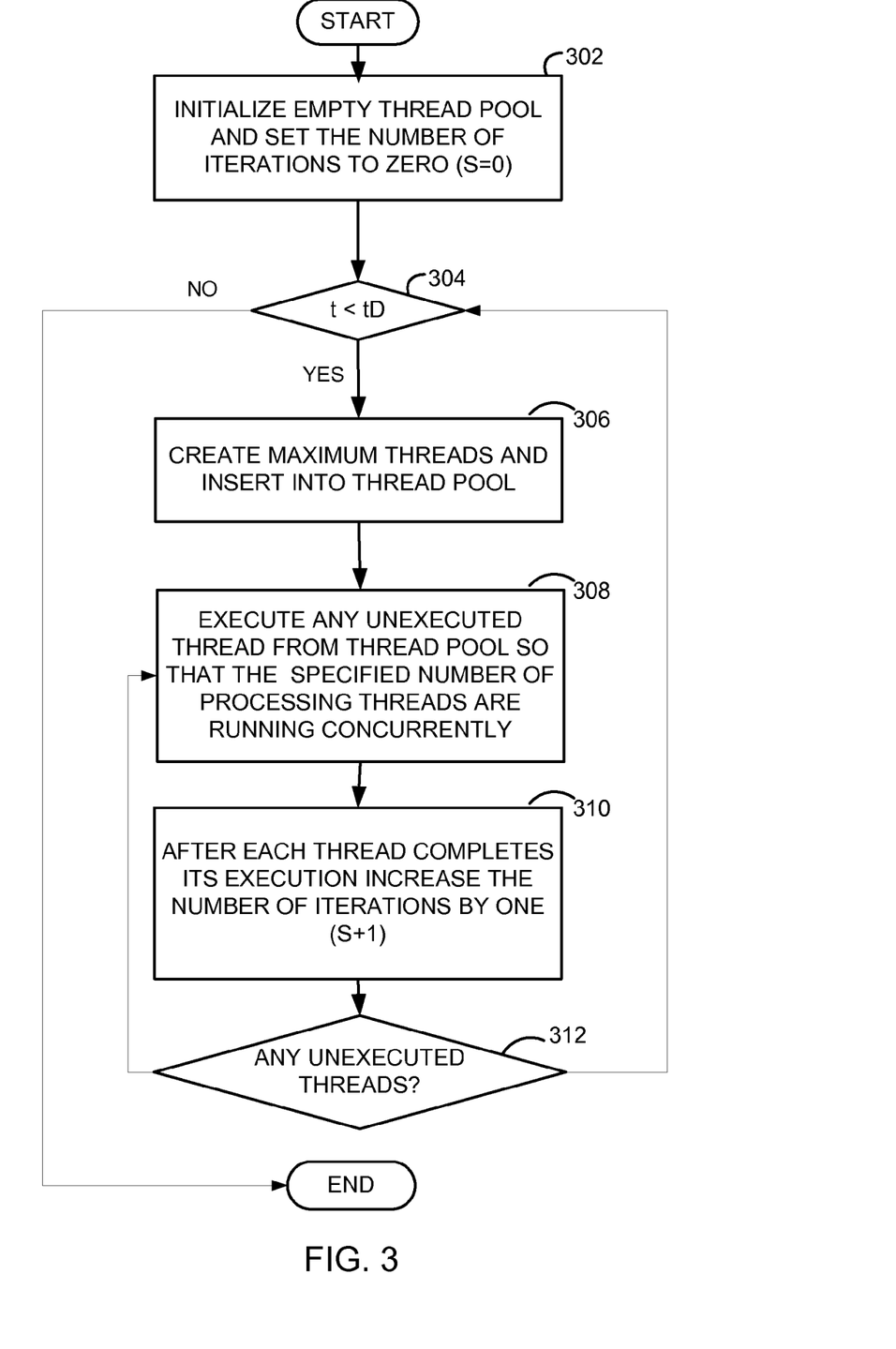
FIG. 3 is a flow diagram of one embodiment of a method of long-term load generation for performance testing.

FIG. 3 is a flow diagram of one embodiment of a method of long-term load generation for performance testing. The method 300 is performed by processing logic that may comprise hardware (circuitry, dedicated logic, etc.), software (such as is run on a general purpose computing system or a dedicated machine), firmware (embedded software), or any combination thereof. In one embodiment, the long-term load generator 120 of FIGS. 1 and 2 performs the method 300. Alternatively, other components of the client machine 102 can perform some or all of the operations of method 300.

Referring to FIG. 3, processing logic begins with initializing an empty thread pool and setting the number of iterations to zero (S=0) (block 302). Next, the processing logic determines if the current time (t) of the test is less than the specified time duration ($t_D$) (block 304). If the current time (t) is not less than the specified time duration ($t_D$), the method ends. Otherwise, the processing logic creates the maximum number of processing threads and inserts them into the thread pool so that the thread pool is the fixed size (maximum number of processing threads) specified in the user input (block 306), and executes any unexecuted thread from the thread pool so that the specified number of processing threads are running concurrently (block 308). After each thread completes its execution, the processing logic increases the number of iterations by one (S+1) (block 310). The processing logic determines if there any unexecuted threads (block 312). If so, the processing logic returns to block 308 to execute any unexecuted thread. Once all threads from the thread pool have been executed, the method returns to block 304 to determine if the current time (t) is less than the specified time duration ($t_D$).

Figure 4A:
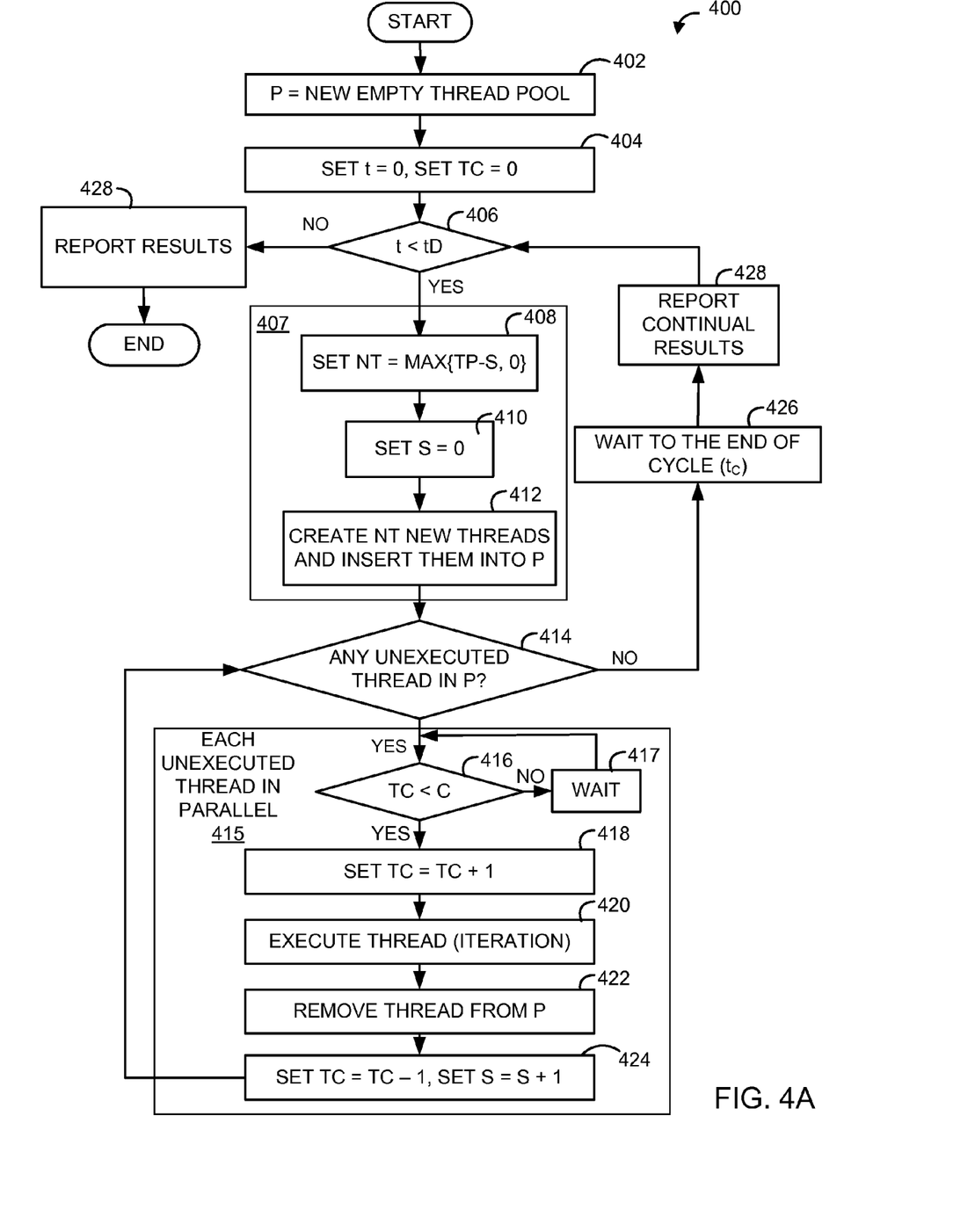
FIG. 4A is a flow diagram of another embodiment of a method of long-term load generation for performance testing.

FIG. 4A is a flow diagram of another embodiment of a method of long-term load generation for performance testing. The method 400 is performed by processing logic that may comprise hardware (circuitry, dedicated logic, etc.), software (such as is run on a general purpose computing system or a dedicated machine), firmware (embedded software), or any combination thereof. In one embodiment, the long-term load generator 120 of FIGS. 1 and 2 performs the method 400. Alternatively, other components of the client machine 102 can perform some or all of the operations of method 400.

Referring to FIG. 4A, processing logic begins with initializing an empty thread pool (P) (block 402). Next, the processing logic sets the current time (t) to zero, and initializes a current thread count (TC) to be zero (block 404). These may be performed at the same time or sequentially in either order. Alternatively, the current time (t) can be set to zero when the processing logic initializes the thread pool (P) to be empty. Next, the processing logic determines if the current time (t) of the test is less than the specified time duration ($t_D$) (block 406). If the current time (t) is not less than the specified time duration ($t_D$), the processing logic reports the results (block 428), and the method ends. Otherwise, the processing logic creates the maximum number of processing threads and inserts them into the thread pool so that the thread pool is the fixed size specified in the user input (block 407). In one embodiment of block 407, the method 450 is performed as described with respect to FIG. 4B. In another embodiment, as depicted in FIG. 4A, the processing logic sets a maximum number (NT) of new processing threads to be created in the respective cycle based on the size of the thread pool (TP) and the number of iterations (S) (block 408), and initializes a number of iterations (S) per cycle equal to zero (block 410). In one embodiment, the maximum number (NT) is based on the user input 201 that specifies the fixed size of the thread pool (TP). In another embodiment, the maximum number (NT) is based on the fixed size of the thread pool less the current number of iterations executed (S) (e.g., NT=MAXI{TP-S, 0}). Next, the processing logic creates the maximum number (NT) of processing threads and inserts them into the thread pool (P) (block 412). In another embodiment, the processing logic creates the threads and inserts them into the thread pool using techniques as would be appreciated by one of ordinary skill in the art having the benefit of this disclosure, such as the embodiment described below with respect to FIG. 4B. This approach guarantees that maximum of thread instances exists in the memory during all the time the long-term load generator 120 is running (e.g., while the current time (t) is less than the specified time duration ($t_D$) at block 406).

Next, the processing logic determines if there are any unexecuted threads of the multiple processing threads in the thread pool (P) (block 414). If there are no unexecuted threads in the thread pool (P) at block 414, the processing logic waits for the end of a current one of the cycles ($t_C$) (block 426), and optionally reports the continual results (block 428), returning to block 406 to determine if the current time (t) is less than the specified time duration ($t_D$). If there are unexecuted threads in the thread pool (P) at block 414, the processing logic continues executing each unexecuted thread concurrently in parallel (block 415).

In one embodiment, for each unexecuted thread to be executed concurrently at block 415, the processing logic determines if the current thread count (TC) is less than the maximum thread count (C) to be executed concurrently. If the current thread count (TC) is not less than the maximum thread count (C), the processing logic waits (block 417) until the current thread count (TC) is less than the maximum thread count (C) at block 416. When the current thread count (TC) is less than the maximum thread count (C) at block 416, the processing logic increments the thread count (TC) by one (block 418), executes the respective unexecuted thread (block 420), removes the respective thread from the thread pool (P) (block 422), decrements the thread count (TC) by one, and increments the number of iterations (S) by one (block 424). Next, the processing logic returns to block 414 to check to see if the thread pool (P) has any unexecuted thread (block 414). If so, the processing logic executes it (block 415); otherwise, the processing logic waits for the end of a current one of the cycles ($t_C$) (block 426), and optionally reports the continual results (block 428), returning to block 406 to determine if the current time (t) is less than the specified time duration ($t_D$). If the current time (t) is not less than the specified time duration ($t_D$) at block 406, the processing logic reports the results (block 428), and the method ends.

Figure 4B:
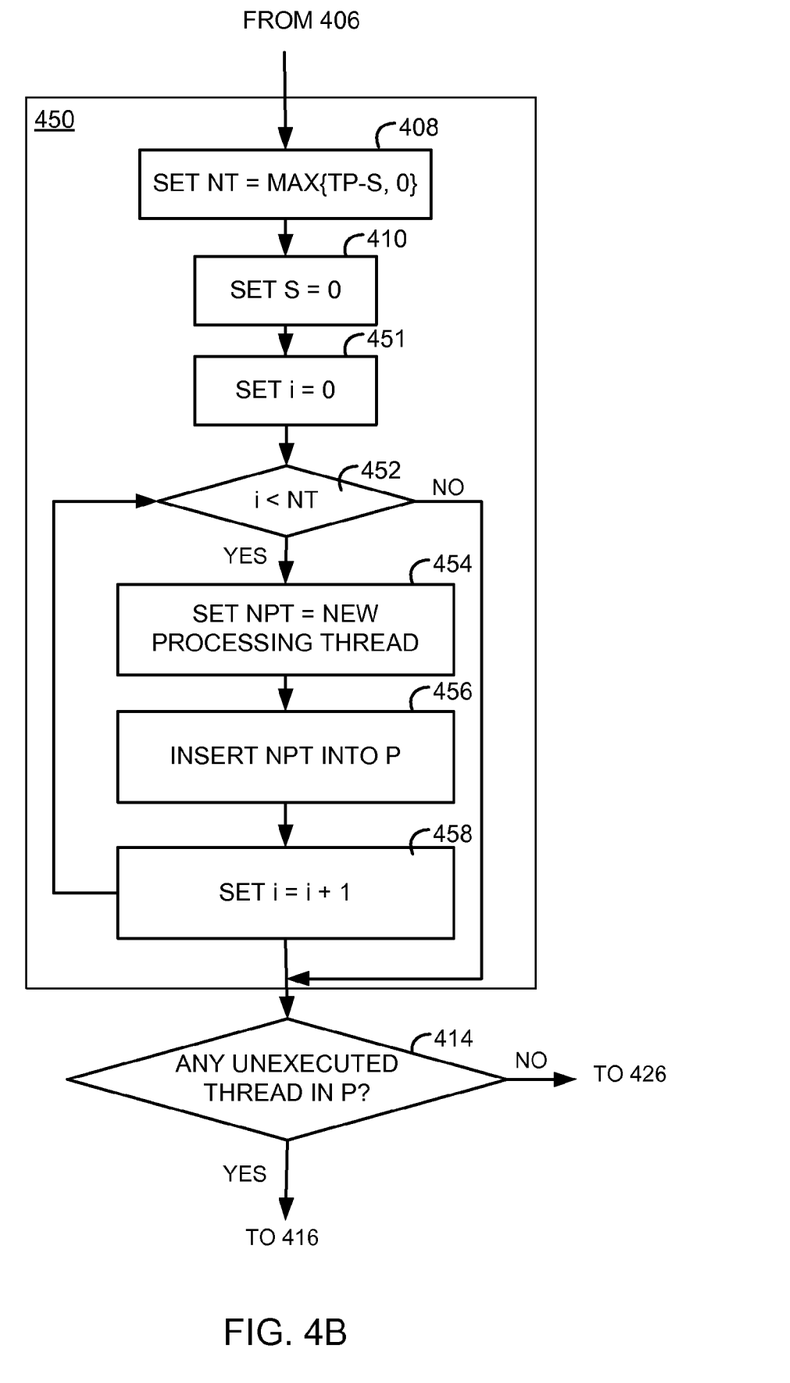
FIG. 4B is a flow diagram of one embodiment of a method of creating a specified number of processing threads for the thread pool.

FIG. 4B is a flow diagram of one embodiment of a method of creating a specified number of processing threads for the thread pool. The method 450 is performed by processing logic that may comprise hardware (circuitry, dedicated logic, etc.), software (such as is run on a general purpose computing system or a dedicated machine), firmware (embedded software), or any combination thereof. In one embodiment, the long-term load generator 120 of FIGS. 1 and 2 performs the method 450. In another embodiment, the thread pool generator 206 of FIG. 2 performs the method 450. Alternatively, other components of the client machine 102 can perform some or all of the operations of method 450. In one embodiment, the method 450 is performed in connection with method 400, but the method 450 is performed in place of block 407 of FIG. 4A.

Referring to FIG. 4B, processing logic begins with setting a maximum number (NT) of new processing threads to be created in the respective cycle based on the size of the thread pool (TP) and the number of iterations (S) (e.g., NT=MAX{TP-S, 0}) (block 408), and initializing a number of iterations (S) per cycle equal to zero (block 410). In one embodiment, the maximum number (NT) is based on the user input 201 that specifies the fixed size of the thread pool (TP). In another embodiment, the maximum number (NT) is based on the fixed size of the thread pool less the current number of iterations executed (S). Next, the processing logic initializes a count (i) to zero (block 452). Next, the processing logic determines if the count is less than the maximum number (NT) (block 452). If so, the processing logic creates a new processing thread (NPT) (block 454), inserts the new processing thread (NPT) into the thread pool (P) (block 456), and incrementing the count (i) by one (block 458), returning to block 452. If the count (i) is not less than the maximum number (NT) at block 452, the processing logic goes to block 414 to determine if there are any unexecuted threads in the thread pool (P), and continues executing the specified number of concurrent processing threads in parallel as described above with respect to method 400 of FIG. 4A.

The depicted embodiments illustrate determining a number of iterations, but in other embodiments, the performance of the test subject 106 can be measured and reported. For example, in one embodiment, a user can specify that the long-term load generator should determine a maximum generating rate (iterations per time period) that can be quantified by the size of the thread pool (TP) divided by specified time period ($t_C$) (TP/$t_C$).

Figure 5:
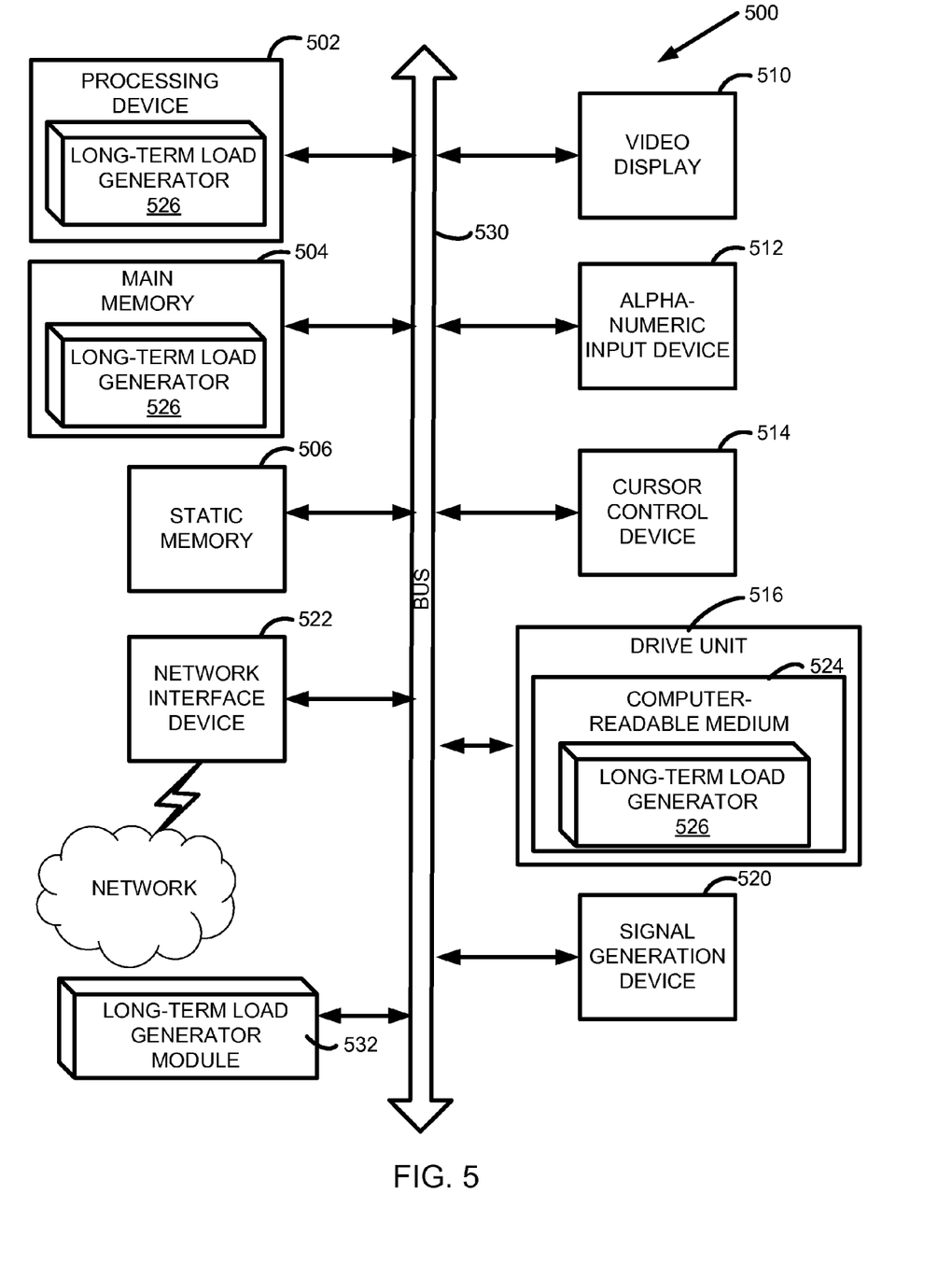
FIG. 5 illustrates a diagrammatic representation of a machine in the exemplary form of a computing system for long-term load generation for performance testing.

FIG. 5 illustrates a diagrammatic representation of a machine in the exemplary form of a computing system 500 for long-term load generation for performance testing. Within the computing system 500 is a set of instructions for causing the machine to perform any one or more of the methodologies discussed herein. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a PC, a tablet PC, a set-top-box (STB), a personal data assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein for long-term load generation for performance testing, such as the methods 300, 400, and 450 described above. In one embodiment, the computing system 500 represents various components that may be implemented in the client machine 102 as described above. Alternatively, the client machine 102 may include more or less components as illustrated in the computing system 500.

The exemplary computing system 500 includes a processing device 502, a main memory 504 (e.g., read-only memory (ROM), flash memory, dynamic random access memory (DRAM) such as synchronous DRAM (SDRAM), etc.), a static memory 506 (e.g., flash memory, static random access memory (SRAM), etc.), and a data storage device 516, each of which communicate with each other via a bus 530.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic (e.g., long-term load generator 526) for performing the operations and steps discussed herein.

The computing system 500 may further include a network interface device 522. The computing system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a computer-readable storage medium 524 on which is stored one or more sets of instructions (e.g., long-term load generator 526) embodying any one or more of the methodologies or functions described herein. The long-term load generator 526 may also reside, completely or at least partially, within the main memory 504 and/or within the processing device 502 during execution thereof by the computing system 500, the main memory 504 and the processing device 502 also constituting computer-readable storage media. The long-term load generator 526 may further be transmitted or received over a network via the network interface device 522.

While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, or other types of mediums for storing the instructions. The term "computer-readable transmission medium" shall be taken to include any medium that is capable of transmitting a set of instructions for execution by the machine to cause the machine to perform any one or more of the methodologies of the present embodiments.

The long-term load generator module 532, components, and other features described herein (for example in relation to FIGS. 1 and 2) can be implemented as discrete hardware components or integrated in the functionality of hardware components such as ASICS, FPGAs, DSPs, or similar devices. The long-term load generator module 532 may implement operations of long-term load generation as described herein with respect to FIGS. 3, 4A, and 4B. In addition, the long-term load generator module 532 can be implemented as firmware or functional circuitry within hardware devices. Further, the long-term load generator module 532 can be implemented in any combination hardware devices and software components.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to utilize the invention and various embodiments with various modifications as may be suited to the particular use contemplated.

What is claimed is:

1. A method, comprising:

receiving, at a first computing system, input that identifies a test subject to be tested, the test subject being at least one of a software feature, a software component, or a software system, executing on a second computing device;

receiving, at the first computing system, input that specifies a number of concurrent processing threads, a size of a thread pool having multiple processing threads that execute performance iterations, and a time duration that specifies for how long the test subject is to be tested; and generating, by a processing device of the first computing system, a multi-threaded load to test performance of the test subject, wherein the multi-threaded load comprises the specified number of concurrent processing threads from the thread pool to be executed for the specified time duration, wherein said generating the multi-threaded load comprises:
    executing the specified number of concurrent processing threads of the multi-threaded load in cycles, each cycle having a specified time period, for the specified time duration; and
    determining a number of performance iterations per cycle in view of a number of processing threads executed in the cycle.

2. The method of claim 1, further comprising:
initializing a current time (t) to zero;
determining if the current time (t) is less than the specified time duration ($t_D$);
in response to the current time being not less than the specified time duration,
    quantifying the performance of the test subject in view of the number of iterations (S) performed by the test subject, and
    reporting the quantified performance, and
in response to the current time being less than the specified time duration, continuing said generating the multi-threaded load.

3. The method of claim 1, further comprising quantifying the performance of the test subject.

4. The method of claim 3, further comprising reporting the quantified performance of the test subject.

5. The method of claim 1, wherein each of the performance iterations is a set of one or more defined operations that uses the test subject.

6. The method of claim 1, wherein at least one of the performance iterations is a single operation that uses the test subject.

7. The method of claim 1, wherein at least one of the performance iterations is a structured pipeline of operations that uses the test subject.

8. The method of claim 1, wherein said generating further comprises determining how many iterations (S) have been executed after each of the cycles.

9. The method of claim 1, wherein said generating the multi-threaded load comprises:
initializing an empty thread pool (P);
initializing a current thread count (TC) to be zero;
for each one of the cycles,
    initializing a number of iterations (S) per cycle equal to zero;
    creating the multiple processing threads in view of the input that specifies the size of the thread pool;
    inserting the created processing threads into the thread pool (P);
    executing the specified number of concurrent processing threads from the thread pool in parallel; and
    determining the number of iterations (S) per cycle in view of the number of processing threads executed in the respective cycle.

10. The method of claim 9, wherein said generating the multi-threaded load further comprises:
initializing a current time (t) to zero when initializing the thread pool (P);
before each of the cycles, determining if the current time (t) is less than the specified time duration ($t_D$), wherein:
in response to the current time being not less than the specified time duration,
    quantifying the performance of the test subject in view of the number of iterations (S) per cycle, and
    reporting the quantified performance, and
in response to the current time being less than the specified time duration, continuing with the next respective cycle.

11. The method of claim 9, wherein said generating the multi-threaded load further comprises:
determining if there are any unexecuted threads of the multiple processing threads in the thread pool (P);
in response to that there are no unexecuted threads in the thread pool (P), waiting for an end of a current one of the cycles, and
in response to that there are unexecuted threads, continuing said executing the specified number of concurrent processing threads in parallel.

12. The method of claim 9, wherein said generating the multi-threaded load further comprises:
waiting for an end of a current one of the cycles;
reporting the determined number of iterations (S) for the current cycle; and
re-initializing the number of iterations (S) per cycle equal to zero for the next cycle.

13. The method of claim 9, wherein said executing the specified number of concurrent processing threads in parallel comprises,
for each unexecuted thread of the multiple processing threads in the thread pool to be executed concurrently,
    determining if a current thread count (TC) is less than a maximum thread count (C) of processing threads to be executed concurrently;
    in response to the current thread count (TC) being not less than the maximum thread count (C),
        waiting until the current thread count (TC) is less than the maximum thread count (C), and
    in response to the current thread count (TC) being less than the maximum thread count (C),
        incrementing the thread count (TC) by one;
        executing the respective unexecuted thread;
        removing the respective thread from the thread pool (P) after the respective thread is completed;
        decrementing the thread count (TC) by one after the respective thread is completed; and
        incrementing the number of iterations (S) by one after the respective thread is completed.

14. The method of claim 9, wherein said creating and inserting the multiple processing threads into the thread pool (P) comprises:
setting a maximum number (NT) of new processing threads to be created in the respective cycle in view of the size of the thread pool and the number of iterations (S) before said initializing the number of iterations (S) per cycle equal to zero;
initializing a count (i) to zero; and
determining if the count (i) is less than the maximum number (NT);
    in response to the count (i) being not less than the maximum number (NT), continuing said
        executing the specified number of concurrent processing threads in parallel, and
    in response to the count (i) being less than the maximum number (NT), creating a new processing thread (NPT);
        inserting the new processing thread (NPT) into the thread pool (P); and
        incrementing the count (i) by one.

15. A non-transitory computer readable storage medium including instructions that, when executed by a processing device, cause the processing device to:
- receive, at the processing device, input that identifies a test subject to be tested, the test subject being at least one of a software feature, a software component, or a software system, executing on a second processing device;
- receive input that specifies a number of concurrent processing threads, a size of a thread pool having multiple processing threads that execute performance iterations, and a time duration that specifies for how long the test subject is to be tested; and
- generate a multi-threaded load to test performance of the test subject, wherein the multi-threaded load comprises the specified number of concurrent processing threads from the thread pool to be executed for the specified time duration,
- wherein to generate the multi-threaded load, the processing device is further to:
  - execute the specified number of concurrent processing threads of the multi-threaded load in cycles, each cycle having a specified time period, for the specified time duration; and
  - determine a number of performance iterations per cycle in view of a number of processing threads executed in the cycle.

16. The non-transitory computer readable storage medium of claim 15, wherein the processing device is further to:
- initialize a current time (t) to zero;
- determine if the current time (t) is less than the specified time duration ($t_D$);
  - in response to the current time being not less than the specified time duration,
    - quantify the performance of the test subject in view of the number of iterations (S) performed by the test subject, and
    - report the quantified performance, and
  - in response to the current time being less than the specified time duration, continue said generating the multi-threaded load.

17. The non-transitory computer readable storage medium of claim 15, wherein the processing device is further to:
- quantify the performance of the test subject; and
- report the quantified performance of the test subject.

18. The non-transitory computer readable storage medium of claim 15, wherein each of the performance iterations is a set of one or more defined operations that use the test subjects.

19. The non-transitory computer readable storage medium of claim 15, wherein the processing device is to:
- initialize an empty thread pool (P);
- initialize a current thread count (TC) to be zero;
- for each one of the cycles,
  - initialize a number of iterations (S) per cycle equal to zero;
  - create the multiple processing threads in view of the input that specifies the size of the thread pool;
  - insert the created processing threads into the thread pool (P);
  - execute the specified number of concurrent processing threads from the thread pool in parallel; and
  - determine the number of iterations (S) per cycle in view of the number of processing threads executed in the respective cycle.

20. The non-transitory computer readable storage medium of claim 19, wherein to generate the multi-threaded load further, the processing device is further to:
- initialize a current time (t) to zero when initializing the thread pool (P);
- before each of the cycles, determine if the current time (t) is less than the specified time duration ($t_D$);
  - in response to the current time being not less than the specified time duration, quantify the performance of the test subject in view of the number of iterations (S) per cycle, and report the quantified performance, and
  - in response to the current time being less than the specified time duration, continue with the next respective cycle.

21. A computing system, comprising:
- a data storage device to store a thread pool that stores a plurality of threads each to execute a performance iteration; and
- a long-term load generator executed by a processing device, coupled to the data storage device, to receive input that specifies a number of concurrent processing threads to test a test subject, a size of the thread pool, and a time duration that specifies for how long the test subject is to be tested,
- wherein the long-term load generator to generate a multi-threaded load that executes the specified number of concurrent processing threads from the thread pool for the specified time duration, and wherein to generate of the multi-threaded load, the long-term load generator to:
  - execute the specified number of concurrent processing threads of the multi-threaded load in cycles, each cycle having a specified time period, for the specified time duration; and
  - determine a number of performance iterations per cycle in view of a number of processing threads executed in the cycle.

22. The computing system of claim 21, wherein the long-term load generator comprise:
- user interface to receive the input;
- a thread pool generator to create the thread pool according to the specified size of the thread pool received from the user interface;
- a thread pool manager to execute the specified number of concurrent processing threads from the thread pool concurrently in parallel;
- a timer to keep track of an amount of time the test subject is being tested; and
- a load manager coupled to the user interface, thread pool generator, thread pool manager, and timer, the load manager to generate the multi-threaded load for the specified time duration.

23. The computing system of claim 22, wherein the long-term load generator further comprises a report generator coupled to the load manager, the report generator to report a quantified performance of the test subject.

* * * * *